United States Patent [19]
Del Signore, II et al.

[11] Patent Number: 5,825,946
[45] Date of Patent: Oct. 20, 1998

[54] CHECK-READING MACHINE

[75] Inventors: James R. Del Signore, II, Trumansberg; Andrew B. Nye, III, Lansing; John G. Mitchell, Ovid; Kathleen Maginnity, Interlaken, all of N.Y.

[73] Assignee: NCR Corporation, Dayton, Ohio

[21] Appl. No.: 582,564

[22] Filed: Jan. 3, 1996

[51] Int. Cl.$^6$ ...................................................... G06K 9/20
[52] U.S. Cl. .......................... 382/320; 382/139; 235/449
[58] Field of Search ..................................... 382/320, 139; 235/449

[56] References Cited

U.S. PATENT DOCUMENTS

| | | |
|---|---|---|
| 4,845,990 | 7/1989 | Kitzinger et al. . |
| 5,033,889 | 7/1991 | Carney . |
| 5,249,118 | 9/1993 | Smith . |
| 5,488,476 | 1/1996 | Harding ................................. 382/320 |

*Primary Examiner*—Harold Pitts
*Attorney, Agent, or Firm*—Mark Levy

[57] ABSTRACT

The present invention features a check-reading and check-validation machine having a programmed microprocessor, a photo-sensor, a magnetizing unit, a magnetic head reader, feed rollers and a stepper motor drive for rotatively driving the feed rollers. The machine may be a sub-unit of a printer. A check is introduced to the nip of the feed rollers. The photo-sensor detects the presence of the check and activates the stepper motor drive. The stepper motor drive then causes the feed rollers to rotate, drawing the check into the reading and validating machine. The microprocessor instructs the stepper motor to feed and discharge the check into and out of the machine, according to a specialized program. The microprocessor program initially instructs the stepper motor to rotate the feed rollers for forward drive, utilizing half-step pulsing. As the check moves past the magnetizing unit and the magnetic head reader, on forward motion into the reading and validating machine, magnetic characters on the check are magnetized. After the calculated number of pulses required for the check to pass the magnetizing unit and the magnetic head reader, the program instructs a reverse-drive direction for the stepper motor, and a simultaneous change of drive phase to wave-drive stepping. The check is read as it is discharged from the machine at a constant speed.

6 Claims, 6 Drawing Sheets

HALF STEP DRIVE FORWARD | WAVE DRIVE REVERSE

HALF STEP DRIVE FORWARD | WAVE DRIVE REVERSE

HALF STEP DRIVE FORWARD | WAVE DRIVE REVERSE

CHECK-READING MACHINE

FIELD OF THE INVENTION

The present invention pertains to reading magnetic characters imprinted on checks and, more particularly, to reading the magnetic characters on checks with a manually-operated validating machine, while the checks are discharged from the machine at a constant speed.

BACKGROUND OF THE INVENTION

It has recently become useful for tradespeople in retail establishments and markets to validate their customers' checks. Prevalent in commercial usage now are small, desktop machines that print receipts for transactions and validate customer checks. One such machine is Model No. 7156, manufactured by Axiohm Corporation of Ithaca, N.Y.

A check to be validated is fed into the above-identified machine by a stepper motor drive unit. The check is driven into the machine until all of the magnetizable ink alphanumeric characters have passed through a magnetizing unit. Then the stepper motor is reversed, and the machine discharges the check at a constant speed. During the discharge phase, the magnetic ink characters on the check surface pass a reader head, where they are read and decoded.

This application reflects the discovery that the reading accuracy of a check's magnetic characters can be enhanced, if the stepper motor can discharge the check at a constant speed, while utilizing wave-drive stepping for the stepper motor propulsion. The forward motion of the check, however, is provided by stepping, using a half-step drive propulsion. Therefore, to change the phase of the motor drive requires a phase transition, while simultaneously reversing the drive direction. Consequently, a microprocessor in the check-reading machine was programmed to provide the proper phase and drive sequencing.

The method of the invention comprises the steps of: (1) feeding a check, having magnetizable ink characters disposed along an edge thereof, into a check-reading machine; (2) moving the check forward into the check-reading machine, using a half-step drive for stepping the motor drive unit; (3) magnetizing the ink characters as the check moves past a magnetizing unit in said machine; (4) changing the phase of the stepper motor drive to wave drive, while simultaneously reversing the drive direction; and, finally, (5) reading the magnetized characters on the surface of the check, as the check is discharged from the machine at a constant speed.

It is an object of this invention to provide an improved check-reading machine and check-validation method.

It is another object of this invention to provide a check-reading machine that will read the magnetic characters disposed on the edge of a check more accurately than those of the prior art.

It is a further object of this invention to utilize a specialized program for driving a stepper motor drive unit of a check-reading machine, so that the check is forward-driven into the machine by employing a drive program, using half-step stepping in a forward direction, and then discharged at a constant speed by simultaneously reversing the stepper motor direction and changing its phase to wave-drive stepping.

It is a further object of this invention to incorporate a check-reading function into a receipt printer.

SUMMARY OF THE INVENTION

In accordance with the present invention, there is provided a check-reading machine having a programmed microprocessor, a photo-sensor, a magnetizing unit, a magnetic head reader, feed rollers and a stepper motor drive for rotatively driving the feed rollers. A check is introduced to the nip of the feed rollers. The photo-sensor detects the presence of the check and activates the stepper motor drive. The stepper motor drive then causes the feed rollers to rotate, drawing the check into the machine. The microprocessor instructs the stepper motor to feed and discharge the check into and out of the machine, according to a specialized program. The microprocessor program initially instructs the stepper motor to rotate the feed rollers for forward drive, utilizing half-step pulsing. As the check moves past the magnetizing unit and the magnetic head reader, on forward motion into the machine, the magnetizable characters are magnetized. After the calculated number of pulses required for the check to pass the magnetizing unit and the magnetic head reader, the program instructs a reverse-drive direction for the stepper motor, and a simultaneous change of half-step drive to wave-drive stepping. The characters of the check are read as the check is discharged from the machine at a constant speed.

BRIEF DESCRIPTION OF THE DRAWINGS

A complete understanding of the present invention may be obtained by reference to the accompanying drawings, when considered in conjunction with the subsequent detailed description, in which:

FIGS. 5$b$–5$i$ show the phase current application sequence for both half-step and wave stepping.

For the purposes of brevity and clarity, like elements and components will bear the same numbering and designations throughout the FIGURES.

DESCRIPTION OF THE PREFERRED EMBODIMENT

Generally speaking, the invention features a check-reading machine that will read the magnetic characters disposed upon the side of a typical check more accurately than such machines heretofore. The check-reading function can be incorporated in a receipt printer. The machine has a microprocessor that is programmed to specially sequence the stepper motor drive that feeds and discharges the check from the machine. The specialized program causes the stepper motor to reverse the feed direction and to simultaneously change the stepping sequence. The check passes the read head with a constant velocity that provides for an improvement in the accuracy of detection.

Figure 1:
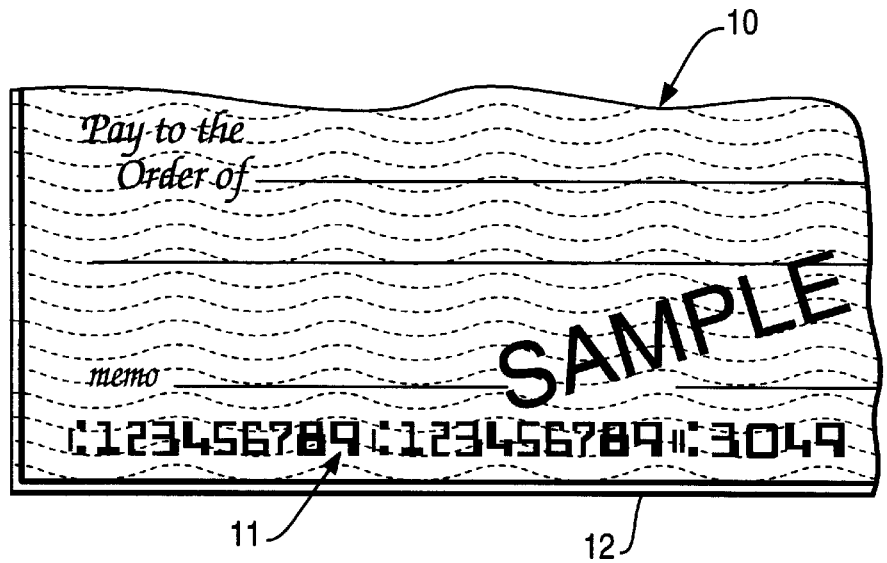
FIG. 1 depicts a view of the face of a typical check having a series of magnetically-coded characters disposed along one edge thereof.

Now referring to FIG. 1, the front face of a typical check 10 is illustrated. Magnetizable ink characters 11 are disposed on the lower edge 12, as shown.

Figure 2:
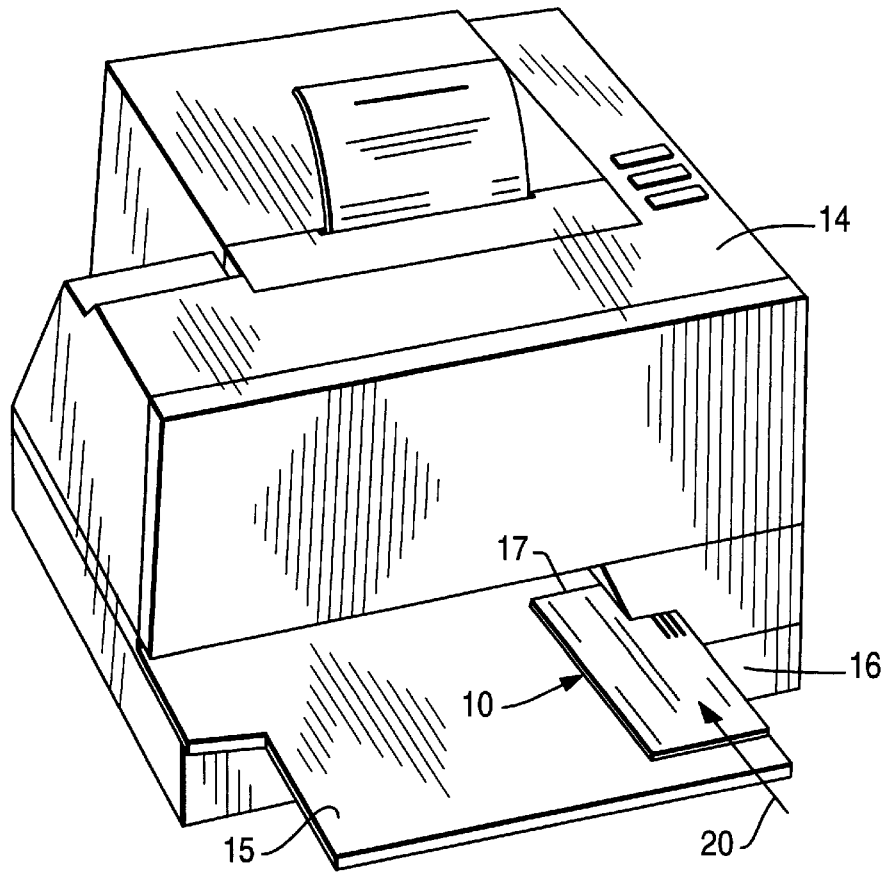
FIG. 2 illustrates a frontal, perspective view of the check-reading machine of this invention, with an in situ view of the check shown in FIG. 1, as it is being introduced into the machine for reading and validating.

Referring to FIG. 2, a check-validation machine 14 of this invention is shown. This machine 14, in the preferred embodiment, is actually a modified receipt printer in which a check-reading function, in accordance with the present invention, is incorporated. The scope of the invention, however, is intended to include any machine in which the inventive method may be practiced. The check-reading machine 14 has a flat slip table 15, upon which the check 10 is positioned. The check 10 is guided into the machine 14 by a vertical guide wall 16 disposed on the right-hand side of the machine 14. The check 10 is pushed by hand (arrow 20) into the machine 14, until the distal edge 17 of the check 10 reaches the nip 21 (see FIG. 3) of a pair of feed rollers 24 disposed therein.

Figure 3:
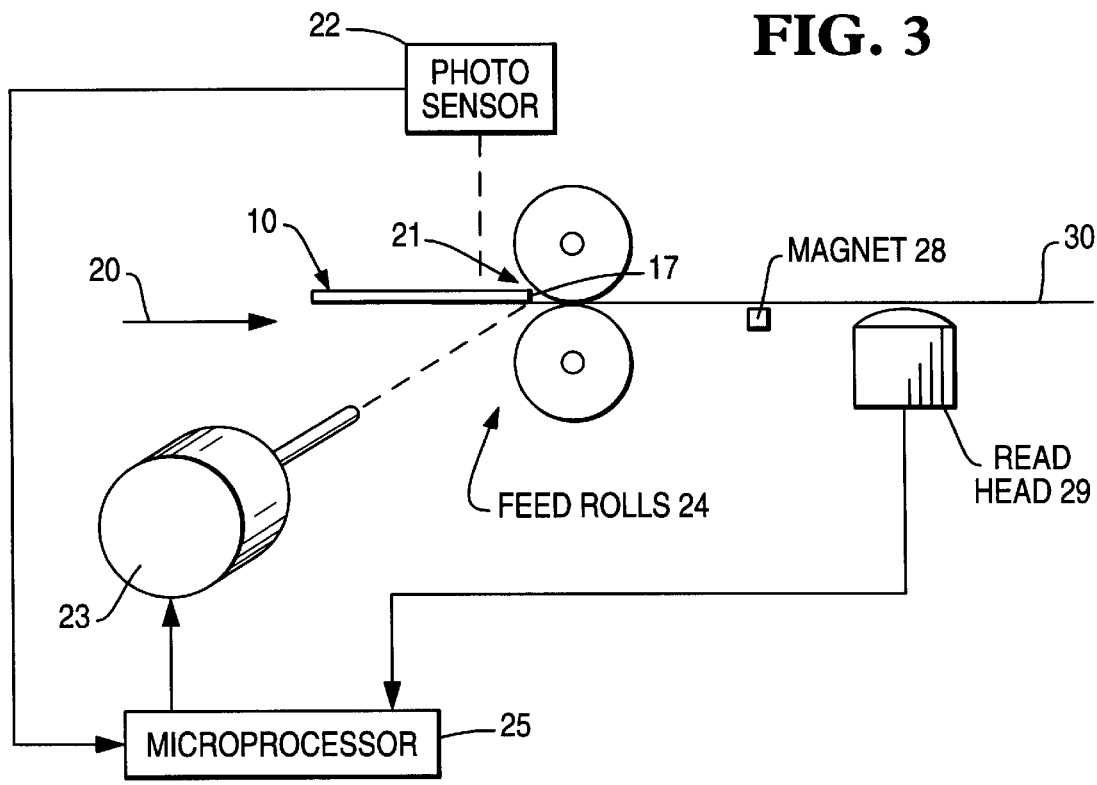
FIG. 3 shows a schematic view of the transport path of the check, as it is being fed into the machine illustrated in FIG. 2.

Referring to FIG. 3, the internal feed path 30 for the check 10 entering (arrow 20) the machine 14 is shown in a schematic diagram. A photo-sensor 22, positioned adjacent the nip 21 of feed rollers 24, senses the forward edge 17 of the check 10 and generates a signal initiating a microprocessor-controlled feed sequence. The microprocessor 25 sends pulses via an electric circuit (not shown) to the stepper motor 23, which then rotatively actuates the feed rollers 24 through appropriate gearing (not shown). The stepper motor 23 is a 5-volt, DC, reversible, permanent magnet, 7.5° stepper, Model No. 17BB-HJW-03, manufactured by Minebea Company, Ltd., of Thailand.

The check 10 is fed forward (arrow 20) along feed path 30, passing a magnet 28 that magnetizes the magnetizable ink characters on the check 10. The check 10, with the magnetized ink characters 11 (FIG. 1), then passes over a read head 29, as shown. The ink characters 11 are not read during the forward movement of the check 10, but, rather, are read when the stepper motor 23 has reversed direction, discharging the check 10.

Figure 4:
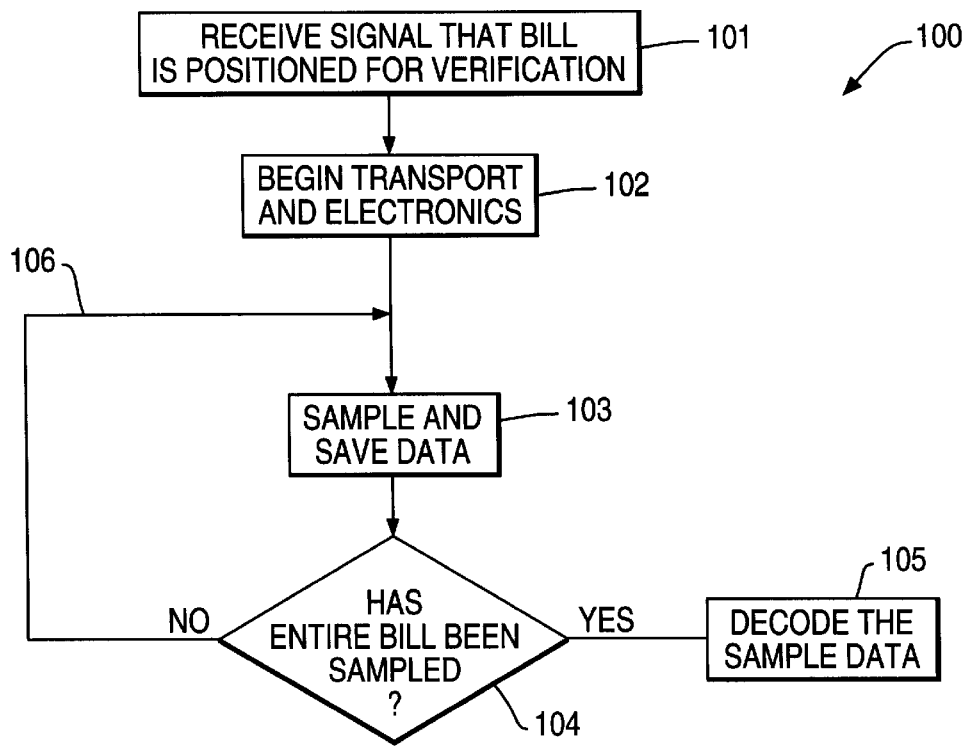
FIG. 4 depicts a flowchart diagram of the microprocessor program for controlling the stepper motor drive.

Referring to FIG. 4, a flow diagram 100 of the method of this invention is illustrated. The microprocessor 25 receives a signal from the photo-sensor 22, indicating that the edge 17 of the check 10 is in the nip 21 of the feed rollers 24, step 101. The microprocessor 25 then initiates the transport of the check 10 along feed path 30, as well as the appropriate electronics for decoding the magnetized ink characters 11, step 102. Once the magnetized ink characters 11 pass the read head 29, the stepper motor 23 reverses direction, and the characters 11 are read from the check 10 upon its discharge from the machine 14, step 103. One data point sample is taken, step 103. One thousand samples are taken per inch. The raw data is saved, loop 106.

The system then determines whether all of the ink characters 11 have been read, step 104. If so, the sampled data from the read head 29 is then decoded and the result is stored in the microprocessor memory, step 105. If all of the characters 11 have not yet been read, step 104, then the check 10 continues past the magnet and read head 28.

Figure 5A:
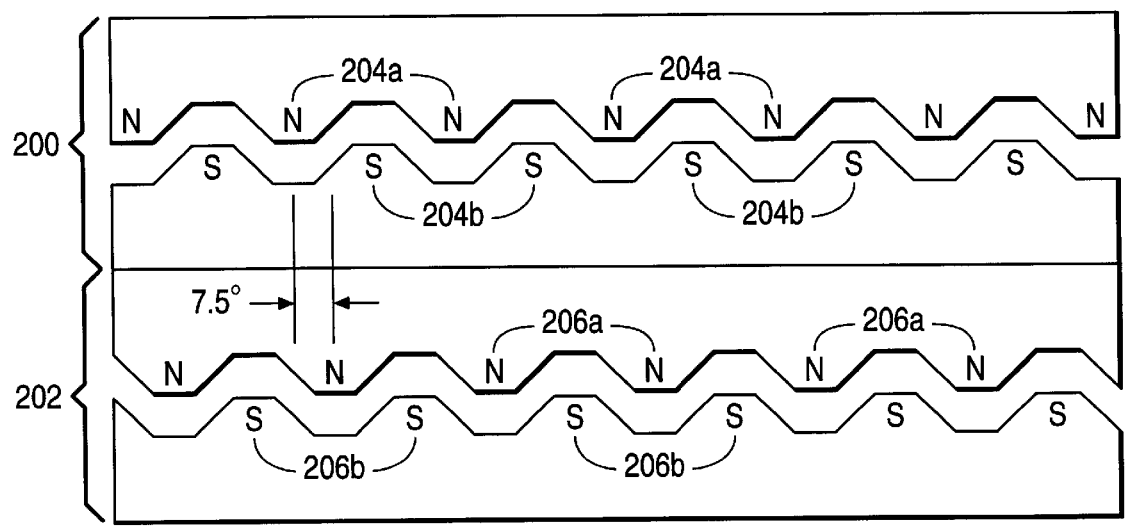
FIG. 5$a$ is a schematic representation of the upper and lower portion pole faces of a typical stepper motor.

Referring now to FIG. 5a, there is shown a schematic representation of an upper portion and a lower portion of a typical stepper motor, shown respectively as reference numerals 200 and 202. Upper portion 200 and lower portion 202 each has a bobbin (not shown) suitably wound with a multi-turn, conductive coil through which current may be passed. When a DC voltage is applied to the upper coil at a first polarity, current passes through the coil in a predetermined, first direction, creating a magnetic field. Current in this first direction is referred to as phase 1 current, and creates north magnetic poles at the upper stator pole faces 204a. If the polarity of the applied DC voltage is reversed, the current flows in the opposite direction. This current flowing in the opposite direction is referred to as phase 2 current, and results in a reversed, induced magnetic field which, in turn, causes upper stator pole faces 204b to become south magnetic poles. Although the faces are schematically distinguishable in this FIG. 5a, physically they are the same entity. If the current direction is repeatedly reversed, stator pole faces 204a and 204b alternate between north and south magnetic poles at a rate essentially equal to the rate of reversal of the applied current.

Lower portion 202 of the motor is physically and operationally essentially the same as upper portion 200. Application of a DC voltage causes current to flow in conductive coil (not shown) in a first direction resulting in north magnetic poles at lower stator pole faces 206b. Current flowing in the lower coil in this first direction is referred to as phase 3 current. Reversing the polarity of the applied DC voltage results in a reversed, phase 4 current and south poles at lower stator pole faces 206b. Lower pole faces 206a and 206b are physically offset 7.5° from upper stator pole faces 204a and 204b.

The magnetic fields at upper and lower stator pole faces 204a, 204b, 206a and 206b interact with a permanent magnet rotor (not shown). The rotor consists of alternating north and south poles and is designed to detent or "step" rotationally to align its poles with poles of opposite polarity at the upper and/or lower stator pole faces 204a, 204b, 206a and 206b.

Any combination of phase 1/phase 2 and phase 3/phase 4 currents may be applied to the stepper motor. In the preferred embodiment, half-step drive is applied to the motor to forward-feed an magnetic ink-encoded check 10 (FIG. 1) into the machine 14 (FIG. 2).

Figure 5B:
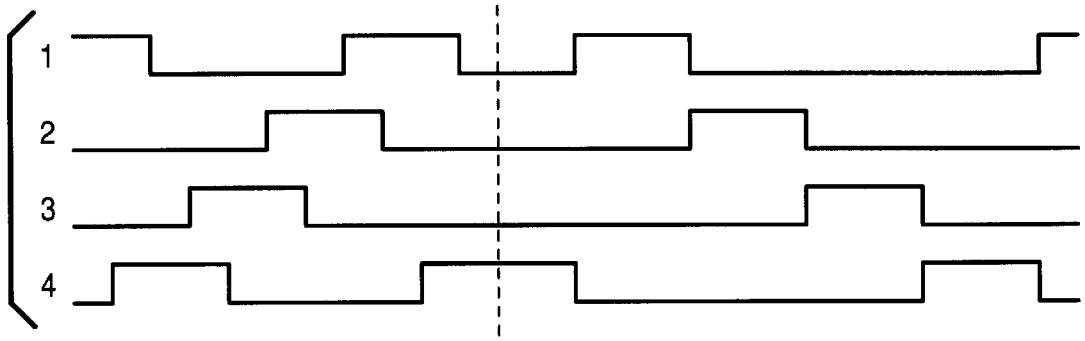
Figure 5C:
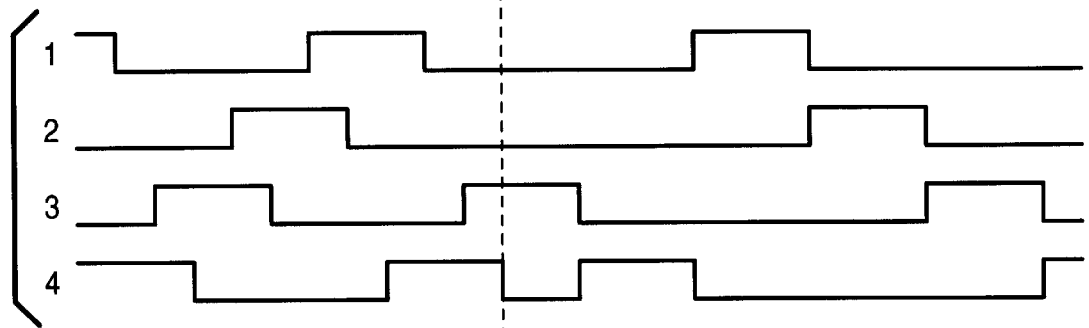
Figure 5D:
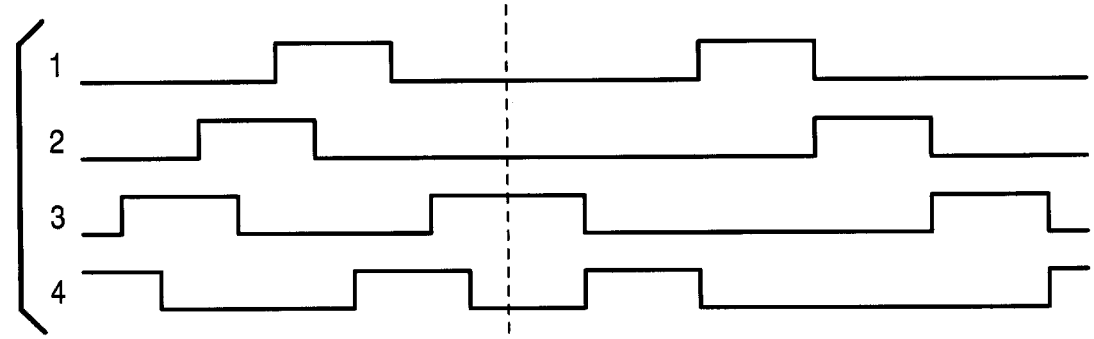
Figure 5E:
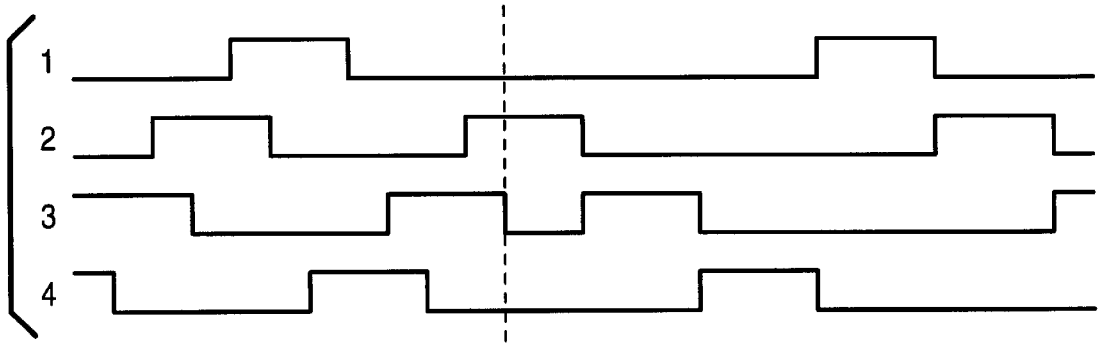
Figure 5F:
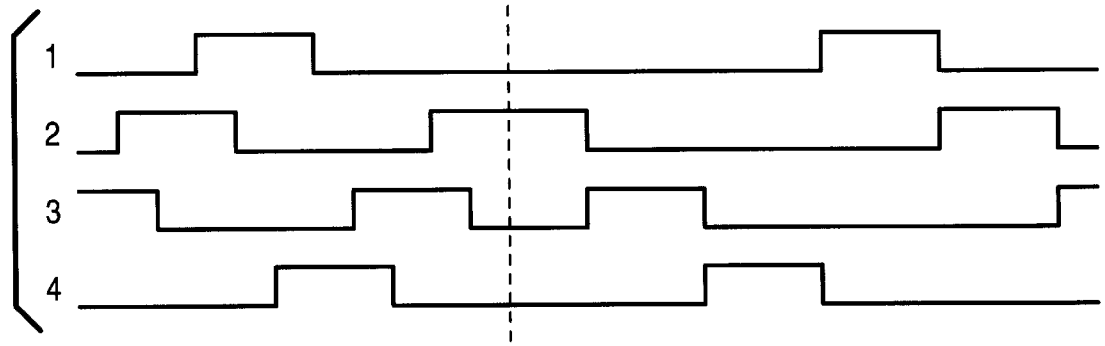
Figure 5G:
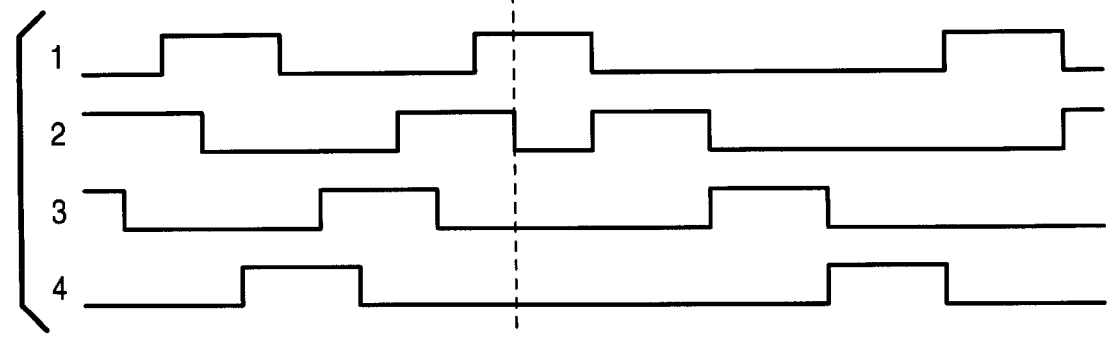
Figure 5H:
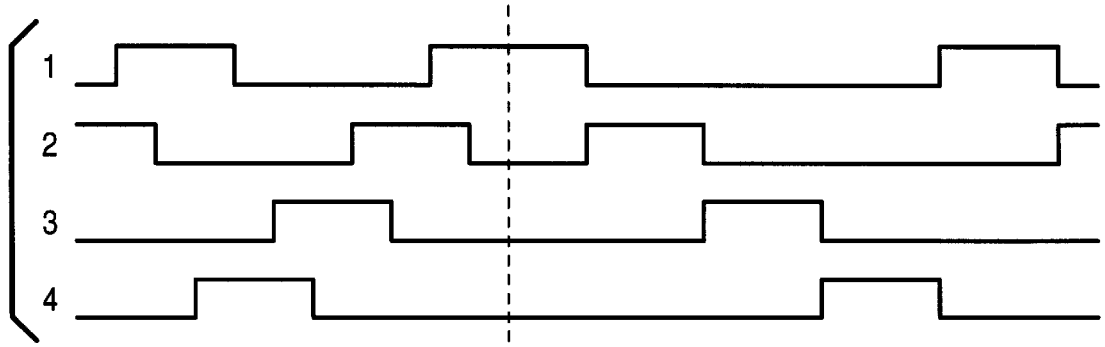
Figure 5I:
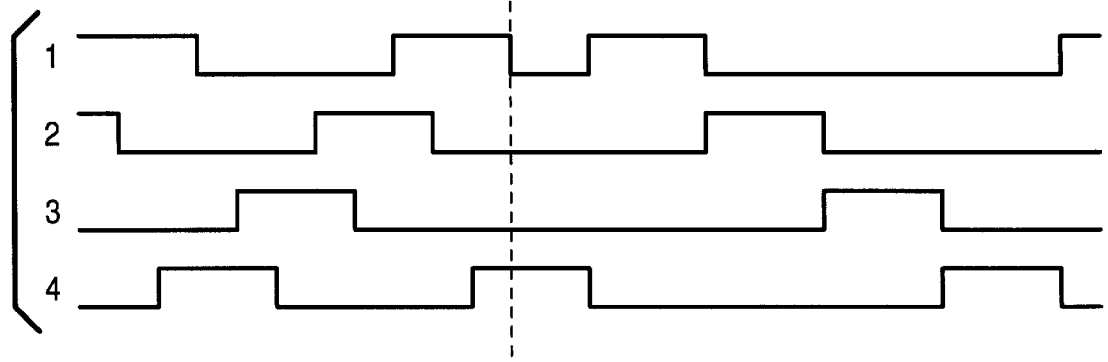

Referring now to FIGS. 5b–5i, there are shown schematic representations of the application sequence of phase current to the stepper motor during the transition from half-step drive in the forward direction to wave drive in the reverse direction. The first side, half-step drive forward, shows the sequence of currents applied to forward-feed the check 10 (FIG. 1) to be magnetized. Referring in particular to FIG. 5bi, note that initially, phase 1 current is applied to the upper coil; and phase 3 current is applied to the lower coil. This is followed by application of phase 1 current to the upper coil only. Phase 1 current is then again applied to the upper coil, while phase 4 current is applied to the lower coil. The sequence continues as shown. Due to this method of sequencing, half of the normal 7.5° step (3.75°) is achieved.

After a predetermined time, the direction of the motor is reversed by changing the sequence. The mode of operation of the stepper motor is also changed from half-step to wave drive in which only a single phase current is applied. The second side of FIG. 5b, wave drive reverse, depicts the sequence of phase currents which is applied, depending upon which of the half-step phase current combinations (first side) is being applied to the motor when the reverse/wave-drive command is given. FIGS. 5b through 5i show the eight possible transitions from a half-step phase current to wave drive. During the wave drive period, the check 10 (FIG. 1) is read by the magnetic head of the machine 14 (FIG. 2).

This inventive technique of simultaneously reversing the stepper motor and changing the drive mode from half-step to wave drive provides a significant benefit. The resulting smooth transition of direction in the check 10 (FIG. 1) permits a reduced number of re-read attempts due to non-constant velocity of the check. The number of pulses needed to drive the check 10 forward into the machine, and then backward from the machine, is predetermined and is a function of the standard size of a typical check. The check-reading machine of this invention is operable also with non-typically-sized checks, provided that the magnetizable characters are appropriately disposed on the side portion of the check face, as is normally required.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of reading and validating a check, comprising the steps of:
   a) feeding a check having magnetizable ink characters disposed on a front surface of the check along an edge thereof into a check-reading machine;
   b) moving the check forward into the check-reading machine, using half-step drive pulsing for stepping a stepper motor drive unit;
   c) magnetizing the magnetizable ink characters as the check moves past a magnetizing unit in said machine;
   d) changing phase of the stepper motor to wave-drive pulsing, while simultaneously reversing drive direction of the stepper motor to discharge said check from said check-reading machine; and then
   e) reading the magnetized characters on the surface of the check, as the check is discharged from the machine at a constant speed, causing the magnetized ink characters to be read with great accuracy.

2. The method of reading and validating a check in accordance with claim 1, wherein the drive pulsing and stepper motor direction are controlled by a program processed by a microprocessor.

3. The method of reading and validating a check in accordance with claim 1, further comprising the step of:
   f) decoding the read characters and storing decoded information in microprocessor memory.

4. A microprocessor-controlled check-reading machine, comprising:
   means defining a feed path relative to a check-machine;
   a reversible stepper motor that is electrically connected to a programmed microprocessor for receiving drive commands therefrom and for driving a pair of feed rollers;
   a pair of feed rollers disposed along said feed path for moving a check to be validated past magnetizing means and a read head;
   magnetizing means disposed adjacent said pair of feed rollers and along said feed path for magnetizing ink-magnetizable characters disposed upon said check, as said check moves past said magnetizing means;
   a read head disposed adjacent said magnetizing means and along said feed path for reading said characters after they have been magnetized by said magnetizing means; and
   a programmed microprocessor that is electrically connected to said read head and said reversible stepper motor for controlling movement of a check being processed in said check-reading machine, with a program of said programmed microprocessor providing changes in drive direction and drive phasing for said stepper motor, so that said stepper motor is half-pulsed to drive said pair of feed rollers when a check is being fed into said check-reading machine and then is wave-driven and reversed to discharge said check from said check-reading machine at substantially constant speed.

5. The microprocessor-controlled check-validation machine in accordance with claim 4, further comprising photo-sensing means disposed adjacent said feed rollers and electrically connected to said programmed microprocessor, said photo-sensing means sensing the presence of a check being hand-fed into said check-validation machine, and, in response thereto, generating a signal to initiate a drive and validating sequence under the control of said programmed microprocessor.

6. A printer comprising microprocessor-controlled check-reading sub-unit, comprising:
   means defining a feed path relative to a check-reading sub-unit;
   a reversible stepper motor that is electrically connected to a programmed microprocessor for receiving drive commands therefrom and for driving a pair of feed rollers;
   a pair of feed rollers disposed along said feed path for moving a check to be validated past magnetizing means and a read head;
   magnetizing means disposed adjacent said pair of feed rollers and along said feed path for magnetizing ink-magnetizable characters disposed upon said check, as said check moves past said magnetizing means;
   a read head disposed adjacent said magnetizing means and along said feed path for reading said characters after they have been magnetized by said magnetizing means;
   a programmed microprocessor that is electrically connected to said read head and said reversible stepper motor for controlling movement of a check being processed in said check-reading sub-unit, with a program of said programmed microprocessor providing changes in drive direction and drive phasing for said stepper motor, so that said stepper motor is half-pulsed to drive said pair of feed rollers when a check is being fed into said check-reading sub-unit and then is wave-driven and reversed to discharge said check from said check-reading subunit at substantially constant speed; and
   photo-sensing means disposed adjacent said feed rollers and electrically connected to said programmed microprocessor, said photo-sensing means sensing the presence of a check being hand-fed into said check-reading sub-unit, and, in response thereto, generating a signal to initiate a drive and validating sequence under the control of said programmed microprocessor.

* * * * *